July 25, 1967  W. E. BISH ET AL  3,332,136
METHOD OF MANUFACTURING LUGGAGE
Filed Aug. 31, 1965  2 Sheets-Sheet 1
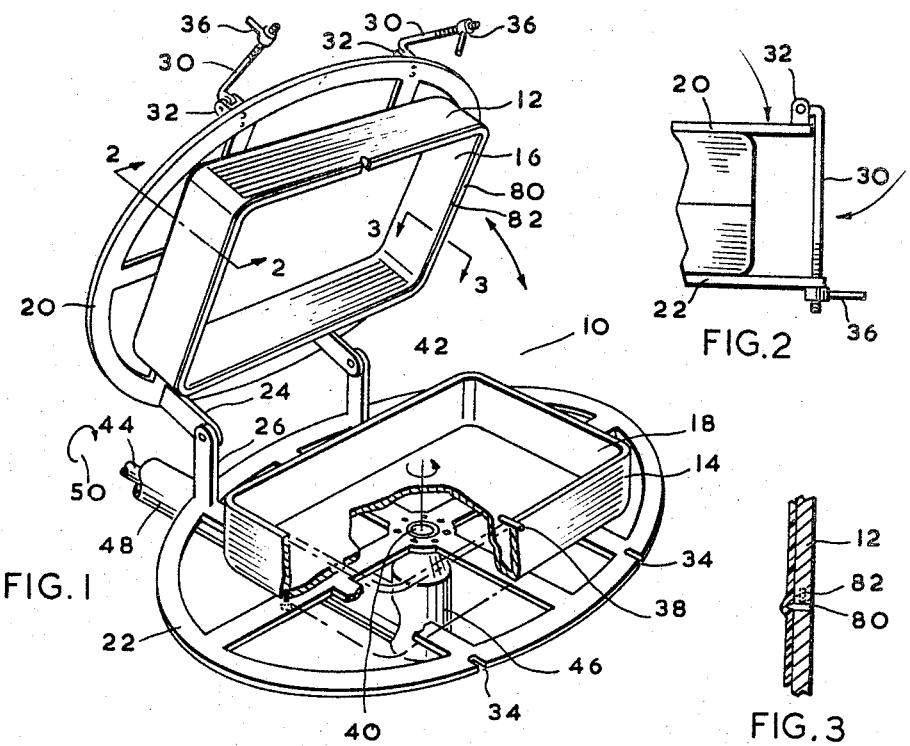
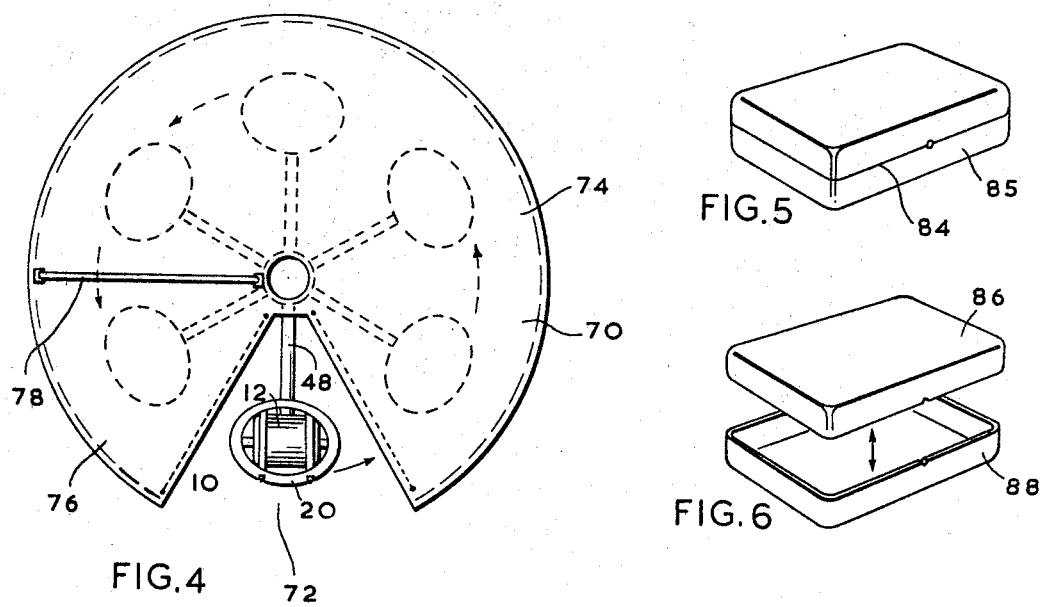
INVENTORS
WILLIAM E. BISH
WILLIAM M. HILL
BY Fetherstonhaugh & Co July 25, 1967  W. E. BISH ET AL  3,332,136
METHOD OF MANUFACTURING LUGGAGE
Filed Aug. 31, 1965  2 Sheets-Sheet 2

INVENTORS
WILLIAM E. BISH
WILLIAM M. HILL
BY Featherstonhaugh & Co.

United States Patent Office 3,332,136
Patented July 25, 1967

3,332,136
METHOD OF MANUFACTURING LUGGAGE
William E. Bish, Kitchener, Ontario, and William M. Hill, Ayr, Ontario, Canada, assignors to The L. McBrine Co. Limited, Kitchener, Ontario, Canada
Filed Aug. 31, 1965, Ser. No. 484,055
Claims priority, application Canada, July 9, 1965, 935,376
8 Claims. (Cl. 29—413)

ABSTRACT OF THE DISCLOSURE

A method of manufacturing plastic luggage which comprises the steps of rotationally moulding a hollow plastic body, removing the hollow body from the mould and splitting the moulded hollow body to provide two complementary shells, rigidly securing edge trim to the split edges to rigidly mount one shell with respect to the other to form a plastic suitcase or the like.

---

The use of plastics in the manufacture of luggage is becoming increasingly popular due to the light weight, strength, and design capabilities of the relatively inexpensive plastic materials.

In vacuum forming the material used is extruded into sheets prior to vacuum forming. The extrusion process itself is a costly and complicated operation. Furthermore, large amounts of scrap material are trimmed from the vacuum formed shape, thus increasing costs, and in addition, it is difficult to obtain the desired detail on the finished luggage shell, such as simulated leather grain. Also when undercuts or reinforcing channels are required on the finished item, the mould required for the vacuum forming operation becomes complicated and therefore costly.

In the injection moulding process the cost of preparing the moulds is very high and it is therefore impractical to use this process for the manufacture of luggage, except where very large quantities of identical items are required. This is particularly undesirable in the manufacture of luggage due to the constantly changing demands in styling. A further disadvantage of injection moulding is that no alterations may be made to the product without incurring considerable expense in the modification of moulds.

It is an object of the present invention to provide an inexpensive method of manufacturing plastic luggage.

It is a further object of this invention to provide a method of manufacturing plastic luggage with a greatly reduced mould cost and also a greatly reduced scrap yield due to trimming of the moulded product.

It is a still further object of this invention to employ a rotational moulding process in the manufacture of plastic luggage.

It is a still further object of this invention to employ a rotational moulding process in the manufacture of plastic luggage wherein the wall thickness of the moulded article can be increased or decreased in any required area to provide a more rigid corner or a more flexible side panel as required.

It is a still further object of this invention to employ a rotational moulding process in the manufacture of plastic luggage wherein metal feet may be inserted into the mould prior to moulding and thereafter form an integral part of the moulded article.

With these and other objects in view the present invention lies in a method of manufacturing plastic articles of luggage comprising the steps of rotationally moulding a hollow plastic body, removing the hollow body from the mould and splitting the moulded hollow body to provide two complementary shells, rigidly securing edge trim to the split edges to rigidly mount one shell with respect to the other.

The invention will be more clearly understood after reference to the following detailed specification read in conjunction with the drawings, in which:

FIGURE 1 is a partially sectioned pictorial view of a mould in the open position.

FIGURE 2 is a partial side view of the mould in the closed position.

FIGURE 3 is a sectional view of a wall of the mould showing a knife edge insert between the halves of the mould.

FIGURE 4 is a plan view of a moulding furnace.

FIGURE 5 is a pictorial view of the moulded article.

FIGURE 6 is a view similar to FIGURE 5 showing the two halves of the moulded article.

Figure 7:
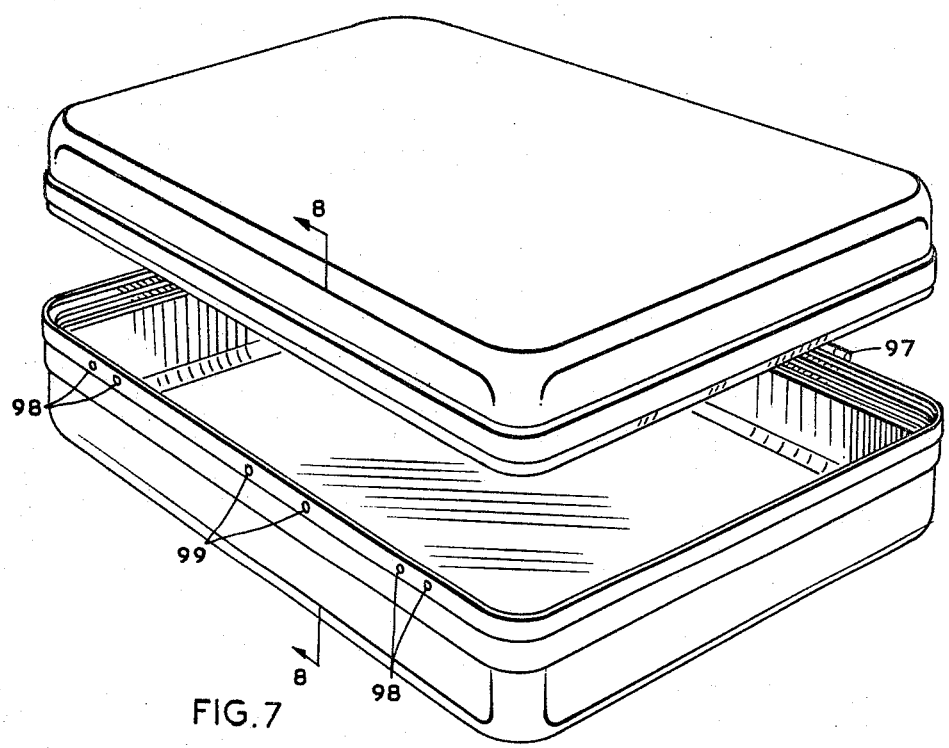
FIGURE 7 is an exploded view of the moulded halves including the edge trim and hinges.

In the drawings the numeral 10 refers generally to a mould comprising an upper mould 12 and a lower mould 14. The upper mould 12 and the lower mould 14 are adapted to co-operate with one another such that the internal surfaces 16 and 18 thereof co-operate to form the external contour of the article to be moulded. An upper frame 20 rigidly supports the upper mould 12 and a lower frame 22 rigidly supports the lower mould 14. The upper frame 20 is pivotably connected to the lower frame 22 by means of co-operating lugs 24 and 26 to permit the upper mould 12 to pivot relative to the lower mould 14. Clamping bolts 30 are pivotably connected to the upper frame 20 by means of mounting brackets 32 and slots 34 are provided in the lower frame 22 to receive the clamping bolts 30 and the two halves of the mould are clamped together by tightening the lock nuts 36 against the lower surface of the lower frame 22.

A small breather pipe 38 may be carried by the lower mould 14 and extends inwardly of the mould to prevent collapsing of the moulded article during the cooling operation as will be described later. The breather pipe 36 is preferably made from a plastic material such as Teflon and lies partially in the lower mould and partially in the upper mould when the mould is closed.

During the moulding operation, the mould 10 is simultaneously roted about a substantially horizontal axis and a substantially vertical axis in order that the granular plastic material may contact all the walls of the container to form a moulded article having the required wall thickness.

The lower frame 22 is rigidly connected to a vertical shaft 40 which is adapted to rotate about a substantially vertical axis 42. The vertical shaft 40 is driven by a drive shaft 44 through suitable gear means (not shown). The vertical shaft 40 is enclosed within a stub 46 which is rigidly connected to one end of a substantially horizontal shaft 48. The shaft 48 is provided with drive means (not shown) such that it may be rotated about the substantially horizontal axis 50.

Heating of the furnace may be carried out in any furnace having a suitable capacity to permit rotation of the mould about both a vertical and a horizontal axis. A particularly suitable furnace is shown in FIGURE 4 wherein the furnace 70 is substantially circular and has an open front to provide a work area 72 wherein the mould can be loaded and unloaded. By employing a circular furnace a plurality of moulds may be used simultaneously and it has been found that a suitable furnace may have six moulds rotatable about the vertical axis of the furnace and spaced equidistant from one another around the furnace. In a machine employing six molds, one mould is being unloaded and loaded while four moulds are being heated and one mould is being cooled. The movement of the mould about the vertical axis of the furnace is intermittent to provide a stationary period within the work zone 72 wherein the mould does not rotate about the substantially vertical shaft 42 or the substantially horizontal axis 54 thereby permitting the mould to be loaded or unloaded. While one mould is stationary in the work area, the remaining five moulds are being rotated simultaneously about their vertical and horizontal axes, four within the heating chamber 74 and one within the cooling chamber 76. A slidably mounted door 78 is provided to divide the heating chamber 74 from the cooling chamber 76, the door 78 being raised to permit the mould to pass from the heating chamber to the cooling chamber when the mould is rotated about the vertical axis of the furnace.

In the manufacture of a plastic body for use in the production of articles of luggage as shown in FIGURES 5 and 6, the mould is charged with a predetermined weight of granular plastic material. A suitable plastic material being polyethylene powder such as that produced by Du Pont and identified as polyethylene powder 2307. As there are negligible losses during the moulding operation, the weight of the final product may be taken to be the weight of the powder required to be added to the mould prior to the moulding operation. The weight of powder required to be added to the mould prior to the moulding operation can therefore be easily determined when the required overall dimensions of the moulded article and the density of the moulded plastic is known.

The granular powder is screened to obtain a powder having a grain size in the region of 30 to 50 mesh.

The mould may be coated by any one of the well known silicone release agents.

The two halves of the mould are firmly clamped together and the mould is passed into the furnace and is heated, while simultaneously rotating about a substantially horizontal and a substantially verical axis, to a predetermined temperature for a predetermined period of time to form a hollow moulded article having an external contour corresponding to the internal contour of the mould. The higher the temperature the shorter the time required for the moulding operation. It will be apparent that the temperature to which the mould is heated and the time required for the moulding operation will vary with the type of plastic in use and the design of the mould, i.e. a mould having a heavy wall section will take longer to heat. As the wall thickness of the finished luggage shell is dependent on the quantity of material loaded into the mould during the moulding cycle, it is possible to increase or decrease the weight of the finished part at will, whereas the wall thickness of an injection moulded article is dependent upon the gap between the male and female mould. It has been found that when employing the mould as previously described herein and the moulding furnace as described to form an article of luggage having a wall thickness in the region of 0.10 inch from a polyethylene powder, a suitable furnace temperature is in the region of 520° F. and a suitable heating time is in the region of 12 minutes with a cooling period of 3 minutes required.

The small breather pipe 38 may be provided in order that air may enter the hollow moulded article when the mould is being cooled to prevent the collapse of the moulded article due to the cooling of the air enclosed within the mould. Since no pressures are developed in the rotational moulding process it is possible to use very thin wall moulds for the manufacture of luggage shells thus drastically reduce the cost of the mould. The reduced cost of the moulds permits the changes of styling so important in the manufacture of luggage.

With reference to FIGURES 1 and 3, it can be seen that a knife edge may be rigidly secured to the upper mould portion 12 such that a weakened score line is formed around the moulded article.

Figures 8, 9:
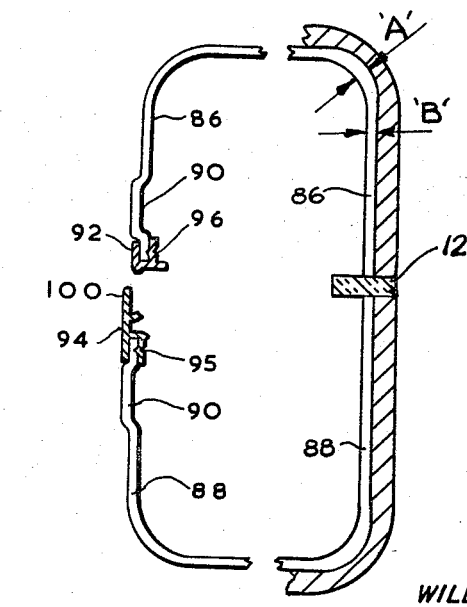
FIGURE 8 is a partial sectional view in the direction of the arrows 8—8 of FIGURE 7.
FIGURE 9 is a partial sectional view of a wall of a mould showing a further embodiment of the invention.

The article of luggage may be formed with various undercuts or wall reinforcing channels such as that shown at 90 in FIGURE 8. By employing a rotational moulding process it has been found that these channels can be readily formed and due to the flexibility of the moulded article it can be easily removed from the mould. By forming an undercut in the side wall of an article of luggage adjacent the free edge of the shell it is possible to locate the metal trim flush with the outer surface of the wall of the moulded article.

When the mould is opened the moulded hollow body may split along the score line 84 formed by the knife edge 80 to form two complementary shells 86 and 88, or, as is generally the case, the moulded article may be removed as a one piece hollow body and then split along the score line 84 to form the complementary shells 86 and 88 as aforesaid.

The two shells 86 and 88 are fitted with suitable edge trim members 92 and 94 (see FIGURES 7 and 8) by crimping as at 95 and 96 or other suitable means. The edge trim members 92 and 94 may be in the form of extruded metal or plastic sections adapted to co-operate with one another to close the two complementary shells in a close fitting relationship and to support suitable hinges such as that indicated by the reference numeral 97 in FIGURE 7. The trim members 92 and 94 are also adapted to locate suitable locks and a handle by means of the apertures 98 and 99 respectively. A suitable lining may also be located by means of the edge trim to provide the required interior finish.

The outer surface of the trim may also be coated with a thin layer of plastic material of matching colour to give the required appearance of the finished article.

A further embodiment of the invention is illustrated in FIGURE 9 wherein an insert 120 is shown in position between the abutting surfaces of the mould in place of the knife edge 80 of FIGURE 3. The insert 120 is preferably made from a material such as asbestos or Teflon about which the moulding plastic does not form, thereby causing two independent shells to be formed during the moulding operation. The use of an insert of this type removes the splitting operation for the moulding process.

As previously stated the thickness of any portion of the moulded article can be varied as required and in FIGURE 9 the corner portions A of the moulded article are shown to be of greater thickness than the general wall thickness B. This is achieved by reducing the thickness of the wall of the mould in the required area. In FIGURE 9 the reduction is achieved by forming the internal surface of the mould and this practice may be employed to provide suitable protrusions such as feet of the moulded article, however an increase in thickness could more easily be achieved by machining the external surface of the mould to effect the required reduction in wall thickness. Generally it has been found that as the wall thickness of the mould decreases the thickness of the moulded article increases and vice versa.

In a still further embodiment of the invention items such as edge trim and feet may be operably located in the mould before the molding operation such that they are rigidly secured to the finally moulded shell in the final product.

It will be apparent that this method of manufacture can be employed for the manufacture of various different articles of luggage or various sizes without any great difficulty.

It will be apparent from the aforegoing that the labour costs involved in the manufacture of an article of luggage by the moulding process described hereinbefore is considerably less than that of the conventional method of manufacturing luggage. Furthermore, it is not necessary to trim any substantial amount of scrap from the moulded article.

Since no pressures are involved in the rotational moulding process, the luggage shells produced will be substantially stress free and thus have great impact strength, whereas luggage shells produced by the vacuum forming and injection moulding processes have heavy stresses trapped in the finished parts thus reducing impact strength particularly at low temperatures.

As variations of the wall thicknesses of the mould or the addition of insulation in certain areas of the mould will result in variations in the wall thickness of the finished luggage shell, it is possible to provide heavy wall thicknesses on parts of the luggage shell where additional strength is required. For instance, by reducing the wall thickness of the mould on the corners of the mould, the luggage shell produced has a heavy wall section on the corners. This feature is particularly desirable since it is often required to reinforce certain areas of a luggage shell. It will be understood that the thickness of any portion of the moulded article can also be controlled by employing baffles mounted on or adjacent the outer surface of the mould to decrease the effective thickness of the mould. The baffles may be attached directly to the mould or to the mould frame and by employing baffles it is possible to produce articles having different strength characteristics from the same mould.

In view of the fact that the finished part is removed from the mould whilst it is still relatively hot, and therefore flexible, it is possible to mould, and remove from the mould luggage shells with relatively deep undercuts. This feature, unlike the vacuum forming and injection moulding processes, incurs no extra mould costs.

Since it is possible to incorporate metal parts into a rotationally moulded luggage shell, by locating the metal parts in the mould prior to moulding, it is practical to make luggage shells with metal parts such as extruded aluminum valances, metal feet, special locks, hinges, etc. moulded into the luggage shell as an integral part of the luggage shell. This feature is particularly important since the cost savings involved by the reduction of subsequent assembly operations are very great.

Due to the combination of some or all of the above features and the great flexibility afforded by the rotational moulding of luggage shells, it is possible to produce luggage shells with great detail at a very economical price and with very desirable qualities.

What we claim is:
1. A method of manufacturing plastic articles of luggage comprising the steps of, rotationally moulding a plastic body having the external contour of an article of luggage, releasing the moulded plastic body from its rotational moulding apparatus to provide two complementary shells, rigidly securing edge trim to the free edges of said complementary shells, hingedly connecting one of said complementary shells to the other to form an article of luggage, said edge trim of one shell being adapted to co-operate with the edge trim of the other shell to permit the hingedly mounted shells to close in a close fitting relationship.

2. A method of manufacturing plastic luggage as claimed in claim 1 wherein said plastic body is formed in two independent complementary shells before it is released from the mould.

3. A method of manufacturing plastic luggage as claimed in claim 1 wherein said complementary shells are of substantially equal depth.

4. A method of manufacturing plastic luggage as claimed in claim 1 wherein said hollow plastic body is formed with reinforcing channels which extend around the free edges of said shells.

5. A method of manufacturing plastic luggage as claimed in claim 1 wherein the free edges of said complementary shell define substantially rectangular openings.

6. A method of manufacturing plastic luggage as claimed in claim 1 wherein said edge trim is in the form of two complementary metallic extrusions adapted to support said hinges and to locate suitable lock means.

7. A method of manufacturing plastic articles of luggage comprising the steps of, rotationally moulding a plastic body having the external contour of an article of luggage, releasing the moulded plastic body from its rotational moulding apparatus, splitting said moulded plastic body to provide two complementary shells, rigidly securing edge trim to the free edges of said complementary shells, hingedly connecting one of said complementary shells to the other to form an article of luggage, said edge trim being of one shell being adapted to co-operate with the edge trim of the other shell to permit the hingedly mounted shells to close in a close fitting relationship.

8. A method of manufacturing plastic articles of luggage as claimed in claim 7 wherein said hollow plastic body is formed with a weakened split line along which the hollow body is split after it has been removed from the mould to form the two complementary shells.

References Cited
UNITED STATES PATENTS

| | | | |
|---|---|---|---|
| 2,841,863 | 7/1958 | Geisler | 29—529 X |
| 3,121,946 | 2/1964 | Young | 29—434 |
| 3,180,019 | 4/1965 | Pollaschek | 29—463 X |
| 3,222,769 | 12/1965 | Leplae | 29—413 |
| 3,242,564 | 3/1966 | Longhini | 29—434 |
| 3,292,252 | 12/1966 | Reading | 29—416 |

JOHN F. CAMPBELL, *Primary Examiner.*

THOMAS H. EAGER, *Examiner.*